United States Patent
Kajihara (10) Patent No.: US 8,078,837 B2
(45) Date of Patent: Dec. 13, 2011

(54) HARDWARE ENGINE CONTROL APPARATUS HAVING HIERARCHICAL STRUCTURE

(75) Inventor: Hirotsugu Kajihara, Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 291 days.

(21) Appl. No.: 12/434,064

(22) Filed: May 1, 2009

(65) Prior Publication Data

US 2009/0282216 A1 Nov. 12, 2009

(30) Foreign Application Priority Data

May 7, 2008 (JP) .................................. 2008-121517

(51) Int. Cl.
*G06F 15/00* (2006.01)
*G06F 15/76* (2006.01)
(52) U.S. Cl. .............................. 712/31; 712/33; 345/504
(58) Field of Classification Search .................. None
See application file for complete search history.

(56) References Cited

U.S. PATENT DOCUMENTS

| 4,434,459 A * | 2/1984 | Holland et al. ............... 712/210 |
| 2003/0041163 A1* | 2/2003 | Rhoades et al. .............. 709/232 |
| 2003/0066057 A1* | 4/2003 | RuDusky ...................... 717/140 |
| 2008/0143730 A1* | 6/2008 | Lindholm et al. ............ 345/501 |
| 2008/0170611 A1* | 7/2008 | Ramaswamy ........... 375/240.01 |

FOREIGN PATENT DOCUMENTS

JP 08-101805 4/1996

OTHER PUBLICATIONS

Shen et al.; Modern Processor Design: Fundamentals of Superscalar Processors; Beta Edition; 2002; McGraw-Hill.*

* cited by examiner

*Primary Examiner* — Corey S Faherty
(74) *Attorney, Agent, or Firm* — Turocy & Watson, LLP (57) ABSTRACT

A hardware engine control apparatus includes: a plurality of hardware engines (HWEs) connected by a control bus, each of the hardware engines executing a series of different kinds of processing; a host control device that outputs control commands for controlling operation of the HWEs to a subordinate control device; and the subordinate control device that has a register, in which the control commands from the host control device is sequentially set, and outputs the control commands set in the register to the control bus at timing based on a clock signal. The HWEs operate according to the control commands output from the subordinate control device.

18 Claims, 4 Drawing Sheets

HARDWARE ENGINE CONTROL APPARATUS HAVING HIERARCHICAL STRUCTURE

CROSS-REFERENCE TO RELATED APPLICATIONS

This application is based upon and claims the benefit of priority from the prior Japanese Patent Application No. 2008-121517, filed on May 7, 2008; the entire contents of which are incorporated herein by reference.

BACKGROUND OF THE INVENTION

1. Field of the Invention

The present invention relates to a hardware engine control apparatus that controls a plurality of hardware engines (HWEs) that execute a series of plurality of different kinds of processing with different control timings.

2. Description of the Related Art

In recent years, a large number of standards concerning signal processing such as moving image processing and radio communication processing are specified. In these standards, data size, processing speed, and the like are specified as parameters. Therefore, a system that performs the signal processing needs to flexibly cope with changes in the parameters.

On the other hand, according to improvement of performance and a reduction in prices of apparatuses for the signal processing, it is also demanded to realize a plurality of standards with one system LSI. For example, there is a demand for a system LSI in which a plurality of standards are integrated such as a moving image processing LSI in which H.264, which is the standard of moving image compression of the ITU-T, and MPEG, which is the standard of moving image compression and expansion of the ISO, are integrated and a radio communication LSI in which a wireless LAN by the standard of the IEEE and ISDB-T, which is the standard of the terrestrial digital broadcast in Japan, are integrated.

In the development of such LSIs, to realize a reduction in a design period and a reduction in cost, it is desirable to extract common arithmetic processing out of processing of the integrated standards and share the extracted arithmetic processing as a hardware engine (hereinafter, "HWE"). However, even if the arithmetic processing is shared, data size treated in the arithmetic processing, required arithmetic processing speed, and the like are different among the standards. Therefore, control corresponding to each of the standards has to be applied to the HWE. Consequently, in realizing a plurality of standards with one system LSI, it is necessary to realize a flexible HWE control mechanism that can absorb parameter changes in the standards and differences among the standards. To realize the flexible HWE control mechanism, it is important to improve a degree of freedom of a control range and make it possible to finely control the HWE at a clock cycle.

In Japanese Patent Application Laid-Open No. 08-101805, a data bus, an arithmetic unit (ALU), a multiplier (MPY), and an accumulating adder (ACC) configure a processor. Data memories are interposed between the data bus and a plurality of dedicated HWEs (DCTs that perform discrete cosine transform and filter circuits (FLT) that perform arithmetic processing for image data). Data transfer between the processor and the dedicated HWEs is realized through the data memories. An amount of access to the data bus during the data transfer to the HWEs is reduced by connecting the data memories and the HWEs by a dedicated bus. Control for start, stop, and the like of the HWEs is realized by mapping the HWEs to a memory address space of the processor.

In Japanese Patent Application Laid-Open No. 08-101805, the HWEs are controlled through the memory address space. Therefore, there is an advantage that flexible control can be performed by rewriting software. On the other hand, for example, fine real-time control in block cycle units cannot be performed and the HWEs cannot be simultaneously controlled.

BRIEF SUMMARY OF THE INVENTION

A hardware engine control apparatus according to an embodiment of the present invention comprises: a plurality of hardware engines (HWEs) connected by a control bus, each of the hardware engines executing a series of different kinds of processing; a host control device that outputs control commands for controlling operation of the HWEs to a subordinate control device; and the subordinate control device that has a register, in which the control commands from the host control device are sequentially set, and outputs the control commands set in the register to the control bus at timing based on a clock signal, wherein the HWEs operate according to the control commands output from the subordinate control device.

According to the present invention, flexible control and fine and highly accurate HWE control in clock cycle units can be performed according to a plurality of different standards, control of HWEs is easy, and design cost is reduced.

DETAILED DESCRIPTION OF THE INVENTION

Exemplary embodiments of hardware engine control apparatus according to the present invention will be explained below in detail with reference to the accompanying drawings. The present invention is not limited to the following embodiments.

Figure 1:
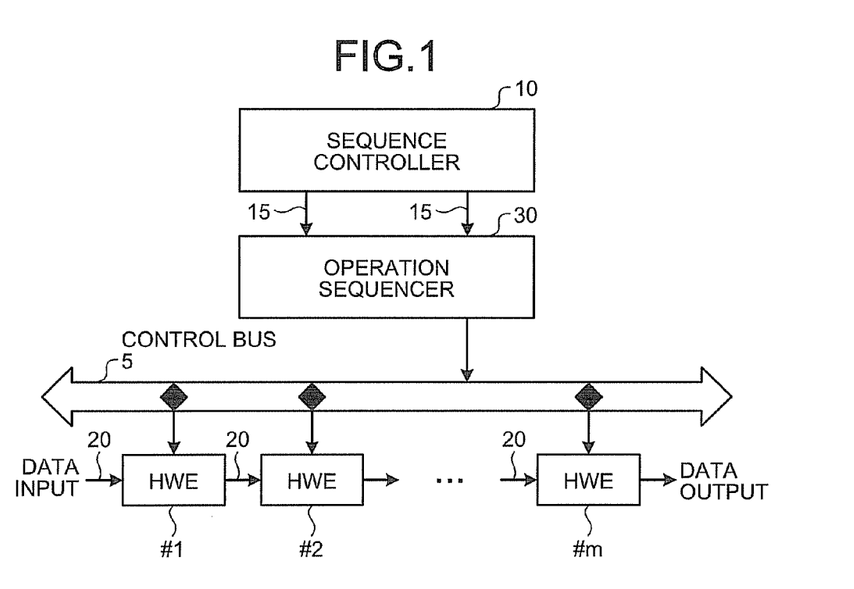
FIG. 1 is a block diagram of an HWE control apparatus according to a first embodiment of the present invention.

FIG. 1 is a block diagram of a configuration example of a hardware engine control apparatus according to a first embodiment of the present invention. The hardware engine control apparatus realizes a plurality of standards concerning moving image processing, radio communication, and the like with one system LSI.

In FIG. 1, a plurality of hardware engines (hereinafter, "HWE") #1 to #m execute a plurality of different kinds of data processing with a series of different control timings. In other words, the HWEs realize a series of data processing and make it possible to execute different kinds of data processing by rewriting control. The hardware engine control apparatus controls the HWEs #1 to #m and includes a sequencer controller (hereinafter, "SQC") 10 as a host control device and an operation sequencer (hereinafter, "OSQ") 30 as a subordinate control device. The OSQ 30 and the HWEs #1 to #m are connected by a control bus 5. The SQC 10 and the OSQ 30 are connected by a dedicated signal line 15 different from the control bus 5. The HWEs #1 to #m are connected by a data line 20 different from a bus structure. In FIG. 1, the HWEs #1 to #m are connected by the data line 20. However, the present invention is not limited to this. Data can be freely exchanged among the HWEs #1 to #m.

The SQC 10 outputs a plurality of control commands for causing the HWEs #1 to #m to execute a series of processing such as radio communication processing concerning a plurality of different standards. The SQC 10 executes, for example, operation control for starting and stopping the OSQ 30 and control-command-setting change control for rewriting the control commands output to the HWEs #1 to #m by the OSQ 30.

The OSQ 30 outputs, according to a control command given from the SQC 10, control commands for one or a plurality of control target HWEs to the control bus 5 in synchronization with a clock signal. In other words, the OSQ 30 operates as a sequencer that outputs the control command given from the SQC 10 to the control bus 5 according to a determined procedure.

The HWEs #1 to #m realize arithmetic processing common to various kinds of processing of different standards in radio communication processing and the like. When this system is applied to the radio communication processing, for example, the HWE #1 executes scramble processing, the HWE #2 executes forward error correction (FEC) processing, the HWE #3 executes mapping processing, the HWE #4 executes fast Fourier transform (FFT) processing, the HWE #5 executes finite impulse response (FIR) processing, and the HWE #6 executes D/A conversion processing and the like. In other words, the HWEs apply, according to a control command from the OSQ 30 acquired via the control bus 5, required kinds of arithmetic processing to data input from the data line 20 and output the data.

Figure 2:
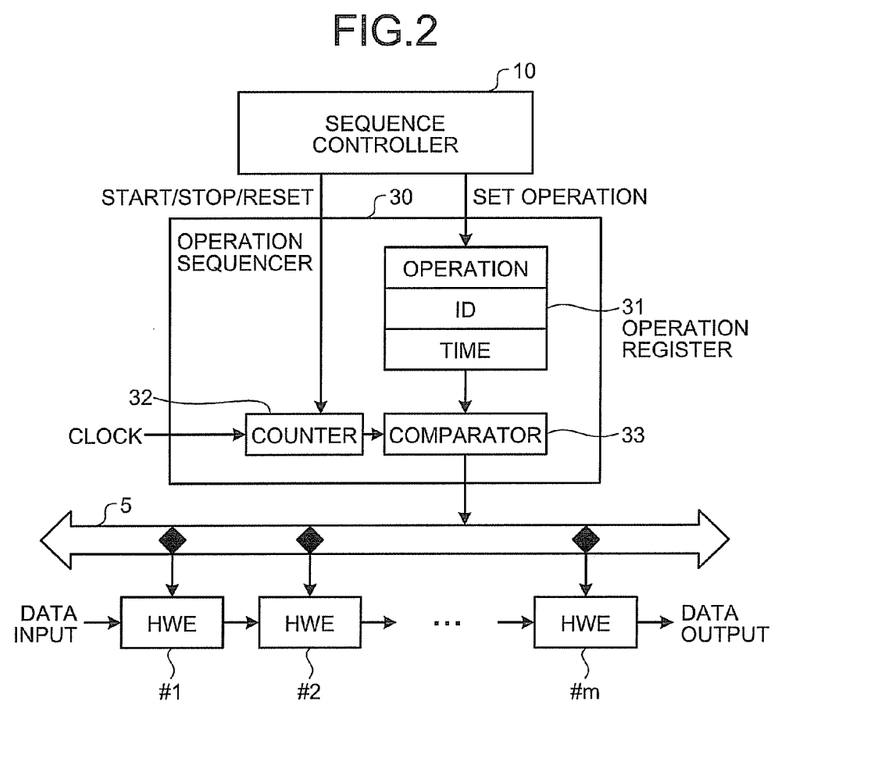
FIG. 2 is a block diagram of the HWE control apparatus according to the first embodiment to which an internal configuration of an operation sequencer (OSQ) is added.

FIG. 2 is a block diagram of a configuration example of a hardware engine control apparatus to which details of an internal configuration of the OSQ 30 is added. In FIG. 2, the OSQ 30 includes an operation register 31 that buffers control commands, a counter 32, and a comparator 33.

The operation register 31 is set by the SQC 10 to be capable of rewriting the control commands. The operation register 31 includes an operation field, an ID field, and a time field. A command code is stored in the operation field. Identifiers (IDs) for identifying the control target HWEs #1 to #m are stored in the ID field. Timing information (in this case, a count value of a clock signal) specifying timing for outputting the control commands and the IDs to the control bus is stored in the time field. The operation field can be arbitrarily defined according to control content desired to be realized. The ID field may be arbitrarily defined. However, if bits equivalent to the number of HWEs are prepared and the bits and the HWEs are associated in a one to one relation, it becomes easy to designate the HWEs and a degree of freedom of control is improved.

The counter 32 is a counter that counts a clock signal. The start, stop, and reset of count operation are controlled according to instructions from the SQC 10. The comparator 33 compares a count value of the counter 32 and a set value of the time field of the operation register 31. When the count value of the counter 32 and the set value of the time field coincide with each other, the comparator 33 outputs the command code set in the operation field and the IDs set in the ID field of the operation register 31 to the control bus 5.

The HWEs #1 to #m determine whether the IDs notified via the control bus 5 and IDs of the HWEs #1 to #m set in advance coincide with each other. When the IDs coincide with each other, the HWEs #1 to #m execute the command code to which the IDs are attached. For example, when the command code is a parameter setting command, the HWEs #1 to #m set parameters. When the command code is an operation start command, the HWEs #1 to #m start operation arithmetic processing. When the command code is an operation stop command, the HWEs #1 to #m stop the operation arithmetic processing. If a plurality of HWEs are designated according to the ID field, the HWEs can be simultaneously controlled. For example, when bits equivalent to the number of HWEs are prepared as the ID field, the HWEs are simultaneously designated by setting bits corresponding to the HWEs, which are simultaneously controlled, to "1" in the ID field. In the first embodiment, the SQC 10 rewrites the operation register 31 every time the comparator 33 issues a control command including a command code and an ID.

In general, in signal processing represented by image processing and communication processing, a result obtained by applying an arithmetic operation to input data according to a procedure determined in advance is output data. The "procedure determined in advance" is specified by a standard or determined by an algorithm. If the "procedure" is always the same, control can be optimized and a control circuit can be realized by hardware. However, to realize adaptation to a parameter change in a standard and adaptation to a plurality of standards, the "procedure determined in advance" has to be changed to control the HWEs. Therefore, in this embodiment, the "procedure determined in advance" is executed by the OSQ 30 and "change of the procedure" is executed by the SQC 10. The adaptation to the standards and the adaptation to the parameter change in the standard are realized by arbitrarily changing control commands set in the OSQ 30.

If there is only one HWE, the OSQ 30 and the HWE only has to be directly connected. However, a plurality of HWEs are often used in the signal processing. Therefore, the HWEs #1 to #m and the OSQ 30 are connected via the control bus 5. Consequently, because the HWEs #1 to #m are integrated in a bus interface, it is easy to add and delete HWEs. There is an effect that design cost can be reduced and simultaneous control (start, stop, mode change, etc.) of a plurality of HWEs is easy.

It is possible to input and output data without the intervention of a buffer such as a memory by closing data paths among the HWEs by the dedicated data line 20. To surely process data at required timing in the HWEs, the OSQ 30 needs to be controlled to operate at a clock cycle. Therefore, the OSQ 30 is actuated based on a clock signal. The OSQ 30 highly accurately controls output timing of a command code based on the clock signal. Therefore, collision of commands on the control bus 5 can be suppressed when the SQC 10 appropriately sets the set value of the time field. Therefore, a bus not specifically having an adjustment function can be adopted as the control bus 5.

As explained above, in the first embodiment, the control commands set in the OSQ 30 can be arbitrarily rewritten by the SQC 10. The OSQ 30 accurately controls output timing of the control commands to the HWEs #1 to #m in clock cycle units. Therefore, flexible control and fine and highly accurate HWE control in clock cycle units can be performed according to a plurality of different standards, control of the HWEs becomes easy, and design cost is reduced. The command code, the IDs for identifying the HWEs, and the timing information specifying timing for executing the command code are set in the operation register 31. The comparator 33 compares the count value of the counter 32 and the timing information of the operation register 31 and outputs the command code and the IDs set in the operation register 31 to the control bus 5 at timing based on the comparison. Therefore, fine and highly accurate HWE control in clock cycle unit can be performed. The SQC 10 rewrites the operation register 31. Therefore, an operation change can be easily performed and flexible control can be performed according to a plurality of different standards.

In the conventional configuration, the OSQ 30 as the subordinate control device is not provided and the SQC 10 as the host control device and the HWEs #1 to #m are directly connected by a bus. In this case, control registers are provided in the HWEs #1 to #m, respectively, and the host control device sets control commands for controlling start, stop, and the like of the HWEs #1 to #m in the control registers of the HWEs to control the HWEs. However, as explained above, fine real-time control in clock cycle units cannot be performed and flexible control corresponding to different standards, specifications, and the like is difficult.

On the other hand, in the configuration of the first embodiment, the control register (the operation register 31) is provided in the OSQ 30. Therefore, a position of the control register viewed from the SQC as the host control device is different from that in the past. The difference, the OSQ 30, and the bus structure make it possible to perform control in clock units and flexible control corresponding to different standards, specifications, and the like. Control registers for parameter setting can be provided in the HWEs #1 to #m.

Figure 3:
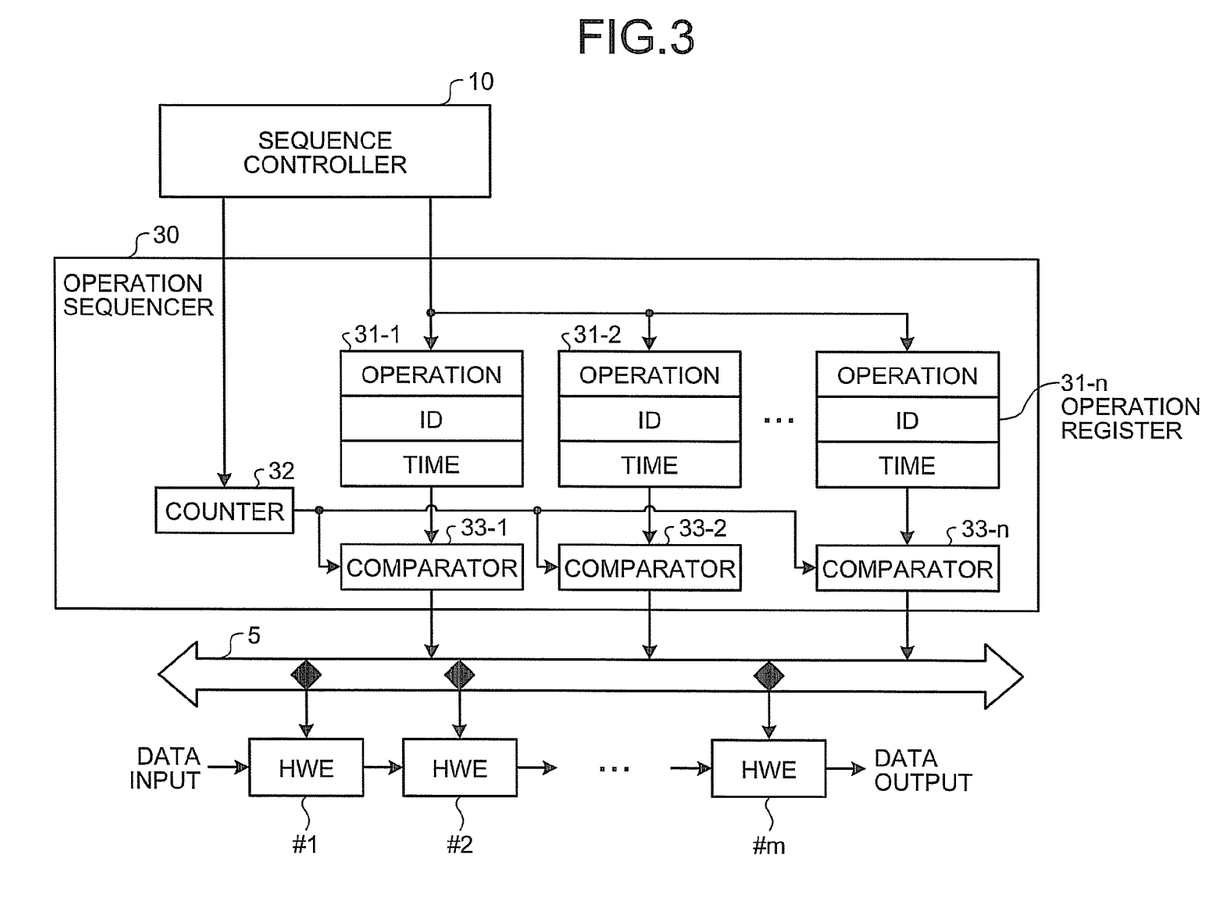
FIG. 3 is a block diagram of an HWE control apparatus according to a second embodiment of the present invention.

In a second embodiment of the present invention, as shown in FIG. 3, the OSQ 30 includes a plurality of pairs of operation registers 31-1 to 31-$n$ and comparators 33-1 to 33-$n$. A count value of the counter 32 is distributed to the comparators 33-1 to 33-$n$. As in the first embodiment, each of the operation registers 31-1 to 31-$n$ includes an operation field, an ID field, and a time field.

The operation registers 31-1 to 31-$n$ and the comparators 33-1 to 33-$n$ are connected to each other in a one to one relation. When a count value set in the time field of the operation register 31-1 and a count value of the counter 32 coincide with each other, the comparator 33-1 outputs a command code set in the operation field and IDs set in the ID field of the operation register 31-1 to the control bus 5. Similarly, when a count value set in the time field of the operation register 31-2 and the count value of the counter 32 coincide with each other, the comparator 33-2 outputs control commands set in the operation field and IDs set in the ID field of the operation register 31-2 to the control but 5. Similarly, when a count value set in the time field of the operation register 31-$n$ and the count value of the counter 32 coincide with each other, the comparator 33-$n$ outputs control commands set in the operation field and IDs set in the ID field of the operation register 31-$n$ to the control bus 5.

For example, a count value "3" is set in the time field of the operation register 31-1 and a count value "6" is set in the time field of the operation register 31-2. When the count value of the counter 32 reaches "3", the OSQ 30 outputs the command code set in the operation field and the IDs set in the ID field of the operation register 31-1 to the control bus 5. When the count value of the counter 32 reaches "6", the OSQ 30 outputs the control commands set in the operation field and the IDs set in the ID field of the operation register 31-2 to the control bus 5. Consequently, when the count value of the counter 32 reaches "3", if a command code received via the control bus 5 is a command code for the HWEs #1 to #m, the HWEs #1 to #m start operation according to the command code. When the count value of the counter 32 reaches "6", if a command code received via the control bus 5 is a command code for the HWEs #1 to #m, the HWEs #1 to #m start operation according to the command code.

To realize the "procedure determined in advance" in signal processing, HWE control needs to be performed a plurality of times. In the second embodiment, control necessary for the "procedure determined in advance" can be stored in the operation registers 31-1 to 31-$n$. Therefore, the number of times of rewriting of the operation registers during processing can be reduced. If the number of operation registers is enough for storing all kinds of necessary control, rewriting of the operation registers does not occur. The same arithmetic operation is often repeated in the signal processing. Therefore, when all controls necessary for the repeated processing are stored in the operation registers 31-1 to 31-$n$, cost required for rewriting is not incurred. When the number of controls necessary for the "procedure determined in advance" is larger than the number of operation registers, rewriting of the operation registers is necessary. However, because the operation registers 31-1 to 31-$n$ are provided, restriction concerning time required for the rewriting and timing of the rewriting is relaxed. As a result, a degree of freedom of control is improved.

Figure 4:
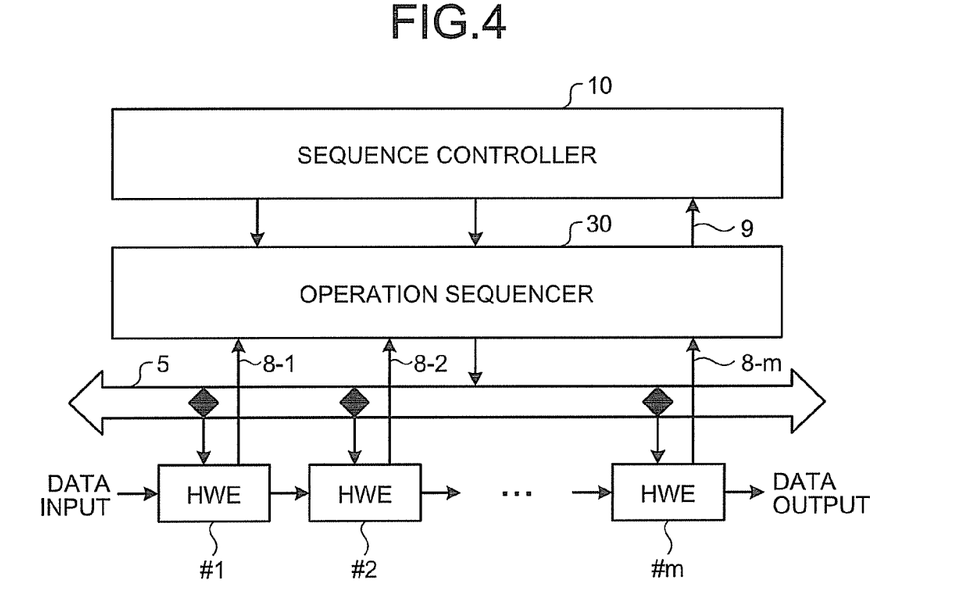
FIG. 4 is a block diagram of an HWE control apparatus according to a third embodiment of the present invention.

In a third embodiment of the present invention, as shown in FIG. 4, feedback lines 8-1 to 8-$m$ are provided from the HWEs #1 to #m to the OSQ 30. Feedback lines 9 are provided from the OSQ 30 to the SQC 10.

In signal processing in the HWEs #1 to #m, a processing procedure may be changed according to a type of input data or a result of an arithmetic operation. The HWEs #1 to #m feed back branch information to the OSQ 30 using the feedback lines 8-1 to 8-$m$ provided in the HWEs #1 to #m. The OSQ 30 feeds back the branch information from the HWEs #1 to #m to the SQC 10 using the feedback line 9.

The SQC 10 changes the processing procedure by rewriting the operation register 31 in the OSQ 30 explained in the first or second embodiment or rewriting an initial value or the like of the counter 32 according to the fed-back branch information.

In the third embodiment, the branch information from the HWEs #1 to #m is input to the SQC 10 via the OSQ 30. Therefore, if the operation register 31 in the OSQ 30 is rewritten or the initial value or the like of the counter 32 is rewritten according to the branch information, it is possible to realize branching of control for a series of signal processing.

Figure 5:
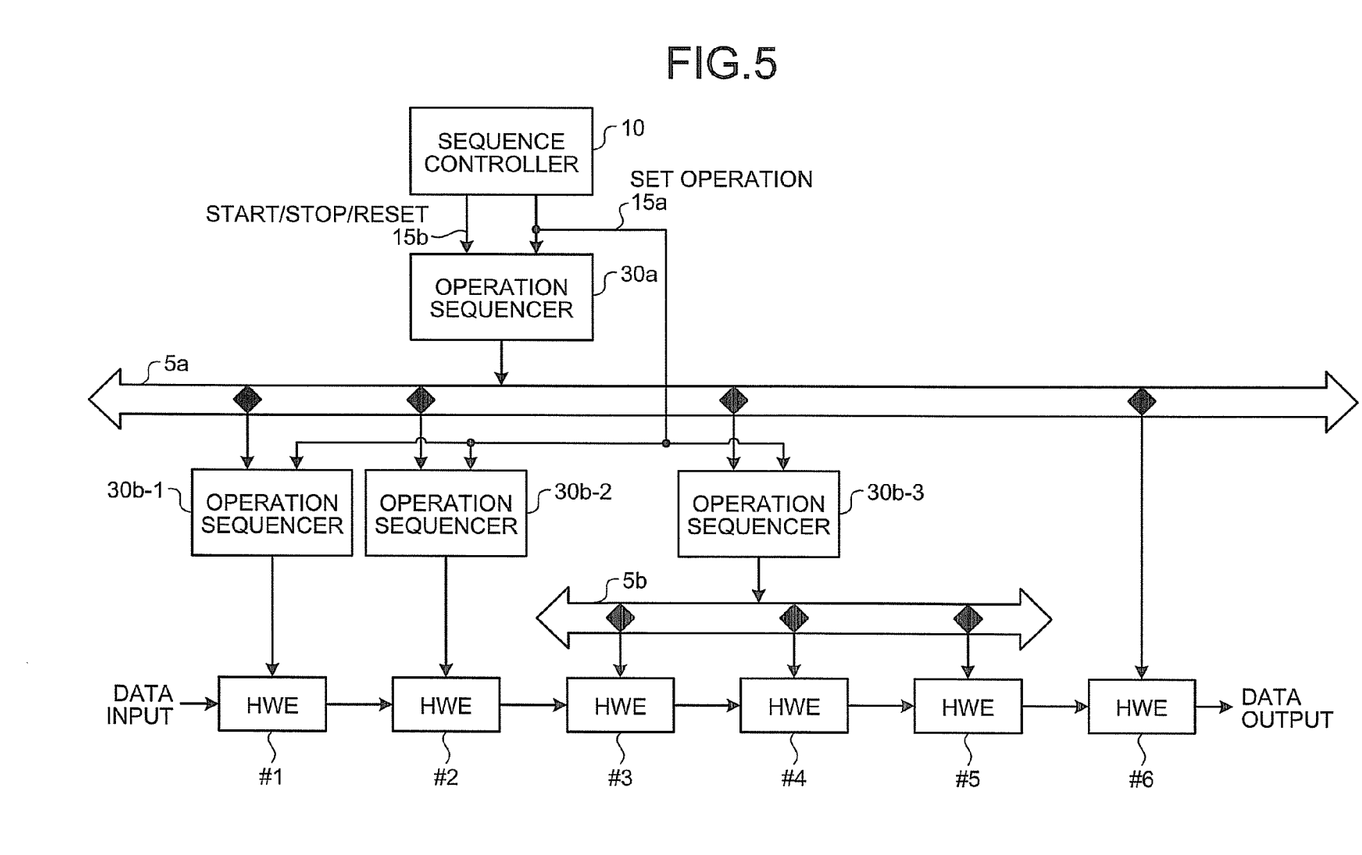
FIG. 5 is a block diagram of an HWE control apparatus according to a fourth embodiment of the present invention.

In a fourth embodiment of the present invention, as shown in FIG. 5, an OSQ is hierarchically configured and, if necessary, a control bus is also hierarchically configured.

In FIG. 5, a host OSQ 30$a$ that performs rough control is connected to the SQC 10. The OSQ 30$a$ is connected to a host control bus 5$a$. Subordinate OSQs 30$b$-1 to 30$b$-3 that perform fine control and the HWE #6 are connected to the host control bus 5$a$. The SQC 10 sets control commands in one or a plurality of operation registers 31, which are incorporated in the host OS 30$a$ and the subordinate OSQs 30$b$-1 to 30$b$-3, via a dedicated control line 15$a$ different from the host control bus 5$a$. Operation start, stop, and reset of a counter 32 of the host OSQ 30$a$ are controlled by the SQC 10 via the dedicated control line 15$b$. Although not shown in the figure, operation start, stop, and reset of counters incorporated the subordinate OSQs 30$b$-1 to 30$b$-3 can be controlled by the SQC 10 or can be controlled by the host OSQ 30$a$.

The HWE #1 is connected to the OSQ 30$b$-1. The HWE #2 is connected to the OSQ 30$b$-2. The HWEs #3 to #2 are connected to the OSQ 30$b$-3 via a subordinate control bus 5$b$. The HWE #6 is directly connected to the host control bus 5$a$.

In the fourth embodiment, the OSQ includes two hierarchies, i.e., the host OSQ 30$a$ and the subordinate OSQs 30$b$-1 to 30$b$-3. The host OSQ 30$a$ carries out rough control (start, stop, mode change, etc.) for the HWEs. The subordinate OSQs 30b-1 to 30b-3 carry out fine control for the HWEs. The OSQs 30b-1 and 30b-2 carry out internal control for the HWEs #1 and #2, respectively. A control bus is unnecessary because the OSQs 30b-1 and 30b-2 and the HWEs #1 and #2 correspond to each other in a one to one relation. On the other hand, the OSQ 30b-3 carries out internal control for the HWEs #3 to #5. The OSQ 30b-3 needs the control bus 5b to control a plurality of HWEs. Such a control bus configuration is effective when there are many common points in the internal control for the HWEs. The HWE #6 is directly connected to the host control bus 5a. When the internal control for the HWEs is simple, subordinate OSQs can be omitted in this way.

The SQC 10 sets control commands for finely controlling operation of the HWEs #1 to #5 in the operation registers 31 of the subordinate OSQs 30b-1 to 30b-3 through the dedicated control line 15a. Further, the SQC 10 sets control commands (e.g., start, stop, mode change, etc.) for roughly controlling to operate the HWEs, which are subordinate to the subordinate OSQs 30b-1 to 30b-3, in the operation register 31 of the host OSQ 30a through the dedicated control line 15a.

The host OSQ 30a outputs the control commands set in the operation register 31 to the required subordinate OSQs 30b-1 to 30b-3 via the host control bus 5a at timing based on the clock signal. The subordinate OSQs 30b-1 to 30b-3 output the control commands input from the host OSQ 30a to required HWEs via the subordinate control bus 5b or dedicated control lines. On the other hand, the subordinate OSQs 30b-1 to 30b-3 output the control commands set in the operation register 31 to the required HWEs via the subordinate control bus 5b or the dedicated control lines at timing based on the clock signal. The HWEs #1 to #5 operate according to the control commands input from the subordinate OSQs 30b-1 to 30b-3.

In the case of the second embodiment, when there are a large number of HWEs or when there are a large number of controls necessary for the "procedure determined in advance", the number of operation registers 31 has to be increased to reduce the number of times of rewriting of the operation registers 31. Further, when it is attempted to even realize fine control in the HWEs, an enormous number of controls have to be performed. As a result, the configuration of the operation registers 31 is increased in size. Therefore, in the fourth embodiment, it is possible to optimize the configuration of the OSQs by hierarchically dividing control. Further, it is possible to contribute to a reduction in circuit size by optimizing the configurations of the OSQs and the control bus according to complexity of the internal control for the HWEs.

In the above explanation, the control in the two-hierarchy configuration is explained. However, the control is also possible in a three or more hierarchy configuration. Although not shown in FIG. 5, when the feedback lines from the HWEs explained in the third embodiment are provided, feedback information is hierarchically returned to the SQC in order of the HWEs, the subordinate OSQs, the host OSQ, and the SQC.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A hardware engine control apparatus comprising:
a plurality of hardware engines (HWEs) connected by a control bus, each of the hardware engines executing a series of different kinds of processing;
a host control device that outputs control commands for controlling operation of the HWEs to a subordinate control device; and
the subordinate control device that has a register, in which the control commands from the host control device are sequentially set, and outputs the control commands set in the register to the control bus at timing based on a clock signal, wherein
the HWEs operate according to the control commands output from the subordinate control device;
the subordinate control device includes:
 a counter that is controlled to operate by the host control device and counts the clock signal;
 a control command register in which the control commands including a command code, IDS for identifying the HWEs that should be caused to execute the command code, and timing information in which timing for causing the HWEs to execute the command code is specified by a count value of the clock signal are rewritably set by the host control device; and
 a comparator that compares the timing information of the control command register with the count value of the counter and, when the timing information and the count value coincide with each other, attaches an ID to the command code and outputs the command code to the control bus.

2. The hardware engine control apparatus according to claim 1, wherein the host control device sets, in the subordinate control device, a plurality of control commands for causing the HWEs to execute a series of processing concerning a plurality of different standards.

3. The hardware engine control apparatus according to claim 1, wherein
IDs are stored in the HWEs in advance, and
the HWEs compares the IDs stored therein and the IDs attached to the command code output from the subordinate control device and, when the IDs coincide with each other, executes the command code to which the IDs are attached.

4. The hardware engine control apparatus according to claim 3, wherein the IDs set in the control command register can simultaneously designate the HWEs.

5. The hardware engine control apparatus according to claim 1, wherein
the host control device and the subordinate control device are connected to the control bus by different dedicated signal lines, and
the host control device sets the control commands including the command code, the IDs, and the timing information in the control command register using the dedicated signal line.

6. The hardware engine control apparatus according to claim 1, wherein data paths among the HWEs are cascaded by a dedicated signal line.

7. The hardware engine control apparatus according to claim 1, wherein the host control device receives feedback information from the HWEs via the subordinate control device and rewrites content of the control command register or the count value of the counter based on the feedback information to thereby change control content of the HWEs.

8. The hardware engine control apparatus according to claim 7, wherein the feedback information includes branch information concerning processing performed by the HWEs.

9. The hardware engine control apparatus according to claim 7, further comprising:
a first feedback dedicated line for inputting the feedback information output from the HWEs to the subordinate control device; and
a second feedback dedicated line for outputting the feedback information, which is input from the HWEs to the subordinate control device, from the subordinate control device and inputting the feedback information to the host control device.

10. The hardware engine control apparatus according to claim 1, wherein the subordinate control device is hierarchically configured.

11. A hardware engine control apparatus comprising:
a plurality of hardware engines (HWEs) connected by a control bus, each of the hardware engines executing a series of different kinds of processing;
a host control device that outputs control commands for controlling operation of the HWEs to a subordinate control device; and
the subordinate control device that has a register, in which the control commands from the host control device are sequentially set, and outputs the control commands set in the register to the control bus at timing based on a clock signal, wherein
the HWEs operate according to the control commands output from the subordinate control device;
the subordinate control device includes:
a counter that is controlled to operate by the host control device and counts the clock signal;
a plurality of control command registers in which the control commands including command codes, IDs for identifying the HWEs that should be caused to execute the command codes, and timing information in which timing for causing the HWEs to execute the command codes is specified by a count value of the clock signal are respectively rewritably set by the host control device; and
a plurality of comparators that compare the timing information of the control command registers with the count value of the counter and, when the timing information and the count value coincide with each other, attach IDs to the command codes set in the control command registers corresponding thereto and respectively output the command codes to the control bus.

12. The hardware engine control apparatus according to claim 11, wherein
IDs are stored in the HWEs in advance, and
the HWEs compares the IDs stored therein and the IDs attached to the command code output from the subordinate control device and, when the IDs coincide with each other, executes the command code to which the IDs are attached.

13. The hardware engine control apparatus according to claim 11, wherein the host control device receives feedback information from the HWEs via the subordinate control device and rewrites content of the control command register or the count value of the counter based on the feedback information to thereby change control content of the HWEs.

14. The hardware engine control apparatus according to claim 11, wherein the feedback information includes branch information concerning processing performed by the HWEs.

15. The hardware engine control apparatus according to claim 11, further comprising:
a first feedback dedicated line for inputting the feedback information output from the HWEs to the subordinate control device; and
a second feedback dedicated line for outputting the feedback information, which is input from the HWEs to the subordinate control device, from the subordinate control device and inputting the feedback information to the host control device.

16. The hardware engine control apparatus according to claim 11, wherein the subordinate control device is hierarchically configured.

17. A hardware engine control apparatus that controls a plurality of hardware engines (HWEs) connected by a control bus, each of the hardware engines executing a series of different kinds of processing, the hardware engine control apparatus comprising:
a host control device that outputs control commands for controlling operation of the HWEs to a subordinate control device; and
the subordinate control device that has a register, in which the control commands from the host control device are sequentially set, and outputs the control commands set in the register to the control bus at timing based on a clock signal, wherein
the HWEs operate according to the control commands output from the subordinate control device;
the subordinate control device includes:
a counter that is controlled to operate by the host control device and counts the clock signal;
a clock command register in which the control commands including a command code, IDs for identifying the HWEs that should be caused to execute the command code, and timing information in which timing for causing the HWEs to execute the command code is specified by a count value of the clock signal are rewritably set by the host control device; and
a comparator that compares the timing information of the control command register with the count value of the counter and, when the timing information and the count value coincide with each other, attaches an ID to the command code and outputs the command code to the control bus.

18. A hardware engine control apparatus comprising:
a plurality of hardware engines (HWEs) including one or a plurality of first HWEs connected to a subordinate control bus and one or a plurality of second HWEs connected to a dedicated signal line, the hardware engines executing a series of different kinds of processing;
one or a plurality of first subordinate control devices connected to the first HWEs by the subordinate control bus;
one or a plurality of second subordinate control devices connected to the second HWEs by the first dedicated signal line;
a third subordinate control device connected to the first and second subordinate control devices by a host control bus; and
a host control device connected to the first, second, and third subordinate control devices by a second dedicated signal line, wherein
the host control device outputs first control commands for finely real-time controlling the HWEs in clock cycle units to the first and second subordinate control devices through the second dedicated signal line and outputs second control commands including control commands for start controlling and stop controlling the HWEs to the third subordinate control device through the second dedicated signal line, the third subordinate control device has a first register in which the second control commands from the host control device are sequentially set and outputs the second control commands set in the first register to the first or second subordinate control devices corresponding thereto via the host control bus at timing based on a clock signal, each of the first subordinate control device has a second register in which the first control commands from the host control device are sequentially set, outputs the second control commands input from the third subordinate control device to the HWEs corresponding thereto via the subordinate control bus, and outputs the first control commands set in the second register to the HWEs corresponding thereto via the subordinate control bus at timing based on a clock signal, each of the second subordinate control device has a third register in which the first control commands from the host control device are sequentially set, outputs the second control commands input from the third subordinate control device to the HWEs corresponding thereto via the first dedicated signal line, and outputs the first control commands set in the third register to the HWEs corresponding thereto via the first dedicated signal line at timing based on a clock signal, and the first HWEs operate according to the first and second control commands output from the first subordinate control device and the second HWEs operate according to the first and second control commands output from the second subordinate control device.

* * * * *